United States Patent
Fosness

[11] 3,830,451
[45] Aug. 20, 1974

[54] AIRCRAFT CONTROL SYSTEM
[75] Inventor: John P. Fosness, Upper Arlington, Ohio
[73] Assignee: Rockwell International Corporation, Pittsburgh, Pa.
[22] Filed: June 28, 1973
[21] Appl. No.: 374,744

[52] U.S. Cl. ............ 244/42 CC, 244/12 R, 244/52, 244/76 J, 244/83 R
[51] Int. Cl. .......................... B64c 9/38, B64c 15/06
[58] Field of Search ..... 244/76 R, 76 J, 83 R, 12 R, 244/12 B, 40 R, 42 CC, 42 CD, 42 D, 45 A, 52

[56] References Cited
UNITED STATES PATENTS

| | | | |
|---|---|---|---|
| 2,945,641 | 7/1960 | Pribram | 244/12 B |
| 2,964,905 | 12/1960 | Hewson et al. | 244/52 X |
| 3,045,947 | 7/1962 | Bertin et al. | 244/52 X |
| 3,618,875 | 11/1971 | Kappus | 244/12 B |
| 3,664,611 | 5/1972 | Harris | 244/42 CD |
| 3,770,227 | 11/1973 | Von Ohain et al. | 244/42 CC |

FOREIGN PATENTS OR APPLICATIONS

| | | | |
|---|---|---|---|
| 1,267,920 | 6/1961 | France | 244/12 R |

Primary Examiner—Trygve M. Blix
Assistant Examiner—Barry L. Kelmachter

[57] ABSTRACT

Apparatus is disclosed for advantageously developing longitudinal, lateral, and directional attitude control and also lift control in improved manners in aircraft systems of the type capable of vertical, hovering, transitional, and conventional modes of flight operation. The aircraft system, having both a principal power plant which produces high-energy primary flow fluid and a fuselage which has attached, fixed aerodynamic lift-producing airfoils, is provided with fluid-reaction lift-producing ejector assemblies in the airfoils at locations symmetrically positioned relative to and laterally distant from the aircraft longitudinal axis and alternatively additionally at a location or locations laterally distant from such longitudinal axis and longitudinally distant from the system center of gravity. Each included airfoil lift ejector assembly is comprised of an airfoil-shaped after injector flap member, a forward ejector flap member which is spaced apart from but operated in combination with the after injector flap member in modes of flight operation other than conventional flight, a core injector essentially centered between the injector flap members, and a conduit conducting high-energy primary flow fluid from the principal power plant to a nozzle in the core injector and to Coanda-blowing slot devices in each system injector flap member during non-conventional modes of system flight. A pilot-operated control device is provided in the system for varying the divergence angles of the lift ejector diffuser sections defined by the flap members in each ejector by coordinated actuation and rotation to thereby vary the system longitudinal, lateral, and directional attitudes and also the system lift control selectively during vertical, hovering and transitional flight while perferably operating the principal power plant at substantially constant power.

7 Claims, 23 Drawing Figures

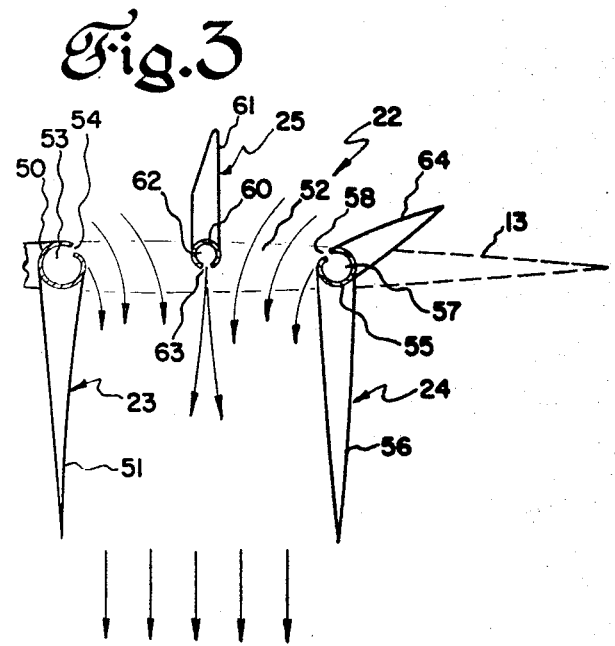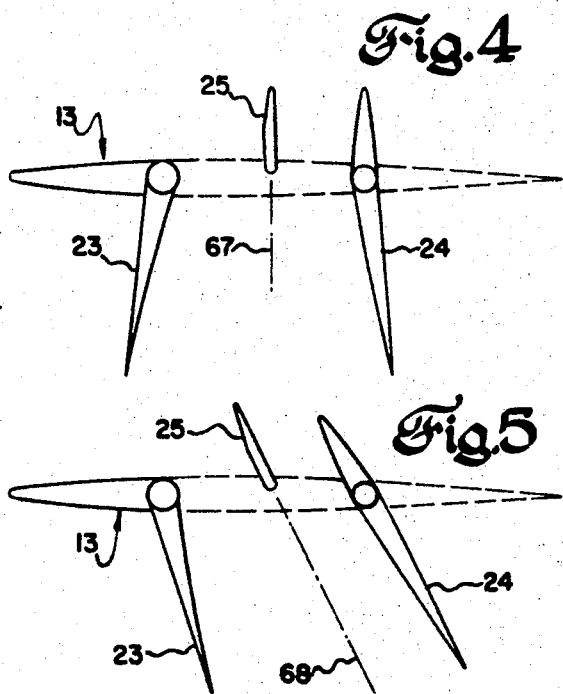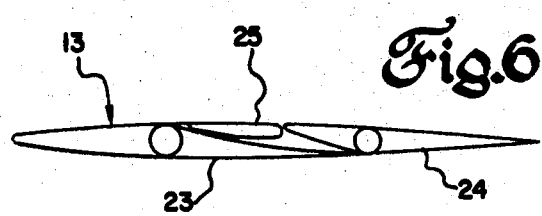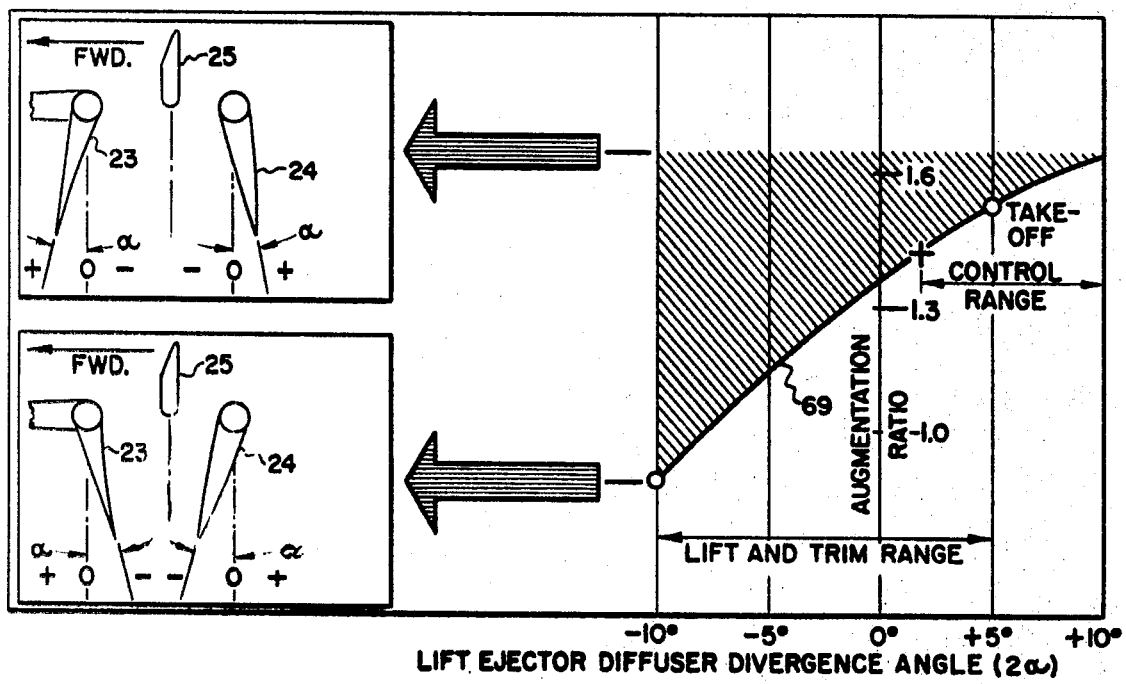

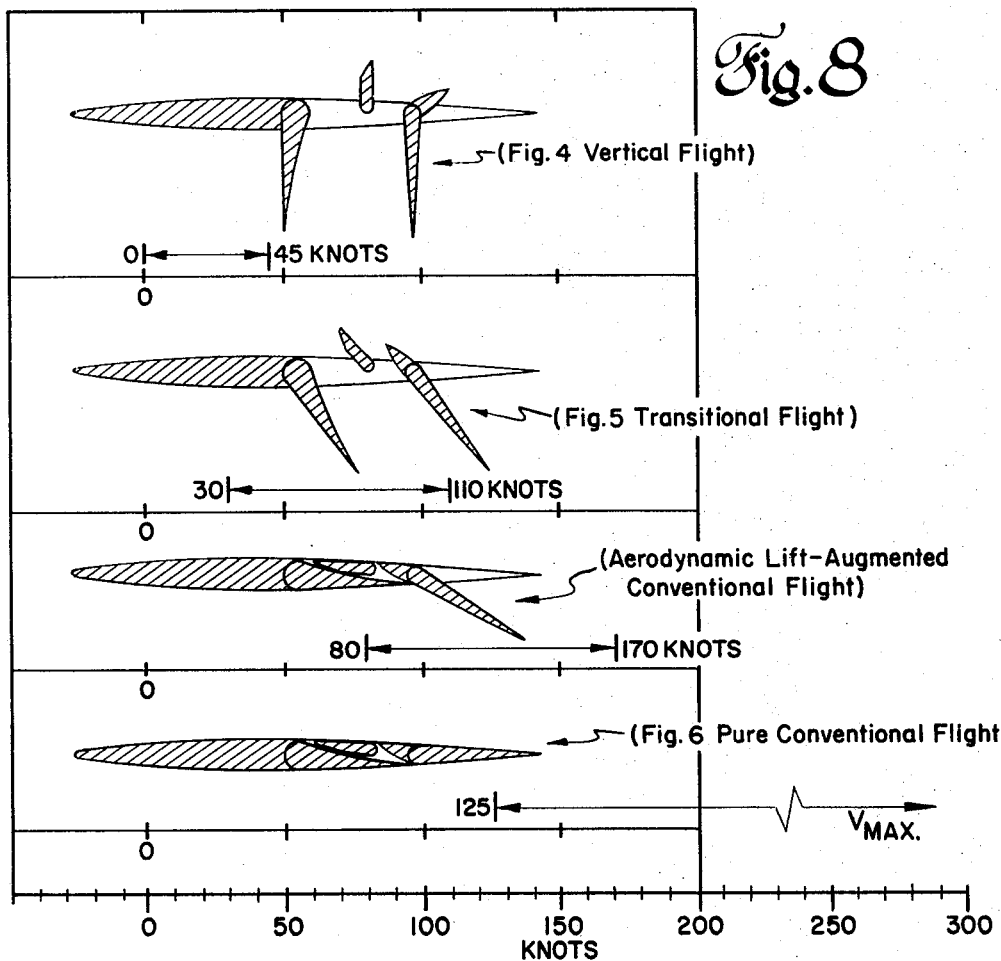

AIRCRAFT CONTROL SYSTEM

CROSS-REFERENCES

This application discloses subject matter common to my co-pending application Ser. No. 374,429, also filed June 28, 1973 and assigned to the assignee of this invention.

SUMMARY OF THE INVENTION

An aircraft system having both a principal power plant which produces high-energy primary flow fluid and a fuselage which has attached, fixed aerodynamic lift-producing airfoils is provided with fluid-reaction lift-producing ejector assemblies in the airfoils at locations symmetrically positioned relative to and laterally distant from he aircraft longitudinal axis and alternatively additionally at a location or locations laterally distant from such longitudinal axis and longitudinally distant from the system center of gravity. Each included airfoil lift ejector assembly is comprised of an airfoil-shaped after injector flap member, a forward injector flap member which is spaced apart from but operated in combination with the after injector flap member in modes of flight operation other than conventional flight, a core injector essentially centered between the injector flap members, and means conducting high-energy primary flow fluid from the system principal power plant to nozzle means in the core injector and to Coanda-blowing slot means in each system injector flap member during nonconventional modes of system flight. Pilot-operated control means are provided in the system for varying the divergence angles of the lift ejector diffuser sections defined by the flap members in each ejector by coordinated actuation and rotation to thereby vary the system longitudinal, lateral, and directional attitudes selectively during vertical, hovering, and transitional flight while preferably operating the system principal power plant at substantially constant power. On actuation of the control system forward flap members to a fully-faired position suitable for a conventional mode of flight operation, the lift ejector assembly after injector flap members only are positioned by the pilot-operated control means to effect changes in system longitudinal and lateral attitudes.

DESCRIPTION OF THE DRAWINGS

FIG. 3 is a schematic cross-sectional view taken at line 3—3 of FIG. 2;

FIGS. 4, 5, and 6 are schematic cross-sectional views illustrating a representative FIG. 1 aircraft system airfoil in vertical flight, transitional flight, and conventional flight mode configurations, respectively;

FIG. 7 illustrates, graphically and pictorially, the operating ranges for airfoil configurations of the FIG. 1 aircraft system as a function of thrust augmentation ratio and as a function of lift ejector diffuser section divergence angle;

FIG. 8 illustrates, graphically and pictorially, the nominal air speed operating ranges of one embodiment of the FIG. 1 aircraft system airfoils for different typical vertical flight, transitional flight, and conventional flight modes of operation;

DETAILED DESCRIPTION

Figures 1, 2:
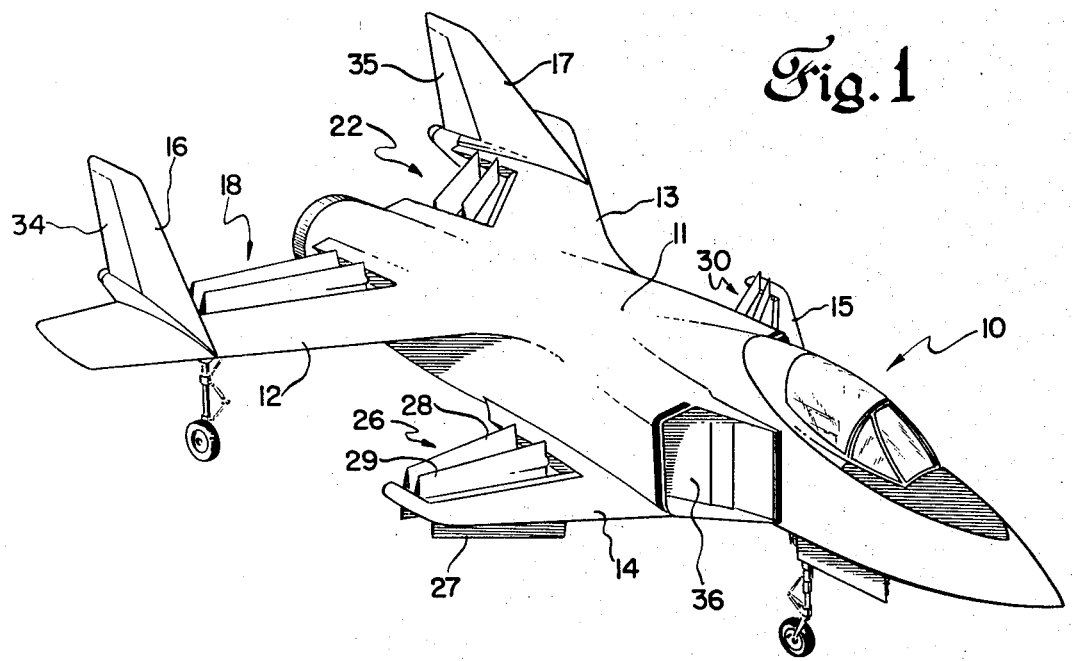
FIG. 1 is a perspective view of an aircraft system utilizing the invention of this application in a vertical ascent/descent or hovering mode of flight operation.
FIG. 2 is a planview schematically illustrating the combined lift ejector assemblies and principal power plant subsystem included in the FIG. 1 aircraft system.

FIG. 1 of the drawings is a perspective view of an aircraft system 10 to which the invention claimed in this application pertains. Such aircraft system is illustrated in its operating configuration for either vertical ascent/descent or hovering flight. Additionally, aircraft system 10 has a capability for a conventional flight mode of operation and a capability for effecting transition between its vertical/hovering flight and conventional flight modes of operation. As shown in the drawings, aircraft system 10 has a fuselage 11 and also has right and left wing airfoils 12 and 13 fixedly attached to fuselage 11. Such airfoils develop the system's principal aerodynamic lift forces during the conventional flight mode of operation. Aircraft system 10 also includes right and left canard airfoils 14 and 15 fixedly attached to fuselage 11 forward of wing airfoils 12 and 13 and also forward of the aircraft system center of gravity. Such canard airfoils are provided for developing aerodynamic lift forces for attitude stabilization and for attitude change control purposes during conventional forward flight. In addition, aircraft system 10 further includes right and left vertical stabilizer airfoils 16 and 17 supported by wing airfoils 12 and 13 in a conventional manner.

For purposes of developing a system vertical flight operating capability, including capabilities for hovering and for achieving transition from a vertical flight mode of operation to a conventional flight mode of operation, and also for purposes of developing fuselage attitude control during all modes of flight, airfoils 12 through 15 are each provided with a hereinafter more-specifically described lift ejector assembly. The lift ejector assembly provided in wing airfoil 12 is referenced by the numeral 18 and is basically comprised of a forward injector flap member 19, an after injector flap member 20, and a center panel injector member 21. See FIG. 2. The additional lift ejector assemblies included in aircraft system 10 are referenced in FIG. 2 and elsewhere in the drawings as 22 in the left wing airfoil 13, as 26 in right canard airfoil 14, and as 30 in left canard airfoil 15. Lift ejector assembly 22 is comprised of forward injector flap member 23, after injector flap member 24, and center injector panel member 25. Lift ejector assembly 26, as shown in the drawings, is comprised of forward injector flap member 27, after injector flap member 28, and center injector panel member 29. Similarly, left canard lift ejector assembly 30 is basically comprised of forward injector flap member 31, after injector flap member 32, and center injector panel member 33. System 10 further includes conventional right and left rudder control surfaces 34 and 35 provided in vertical stabilizers 16 and 17, respectively. Air inlet opening 36 shown in FIG. 1 is a part of the aircraft system principal power plant subsystem 37 illustrated schematically in FIG. 2.

Referring to FIG. 2, power plant subsystem 37 further includes branched inlet ducting 38 cooperating with inlet openings 36, engine inlet section 39, a compressor section 40, a combustion section 41, a turbine section 42, a diverter section 43, an after burner section 44, and a nozzle section 45. The exact form of principal power plant subsystem 37 is not critical to the claimed invention except that such subsystem must provide an adequate supply of high-energy fluid for utilization in lift ejector assemblies 18, 22, 26 and 30 incorporated in the aircraft system airfoils, as well as develop those thrust forces necessary for forward propulsion of system 10 during conventional flight operation. High-energy fluid extracted from propulsion subsystem 37 at the shroud means designated 46 is proportioned and distributed to the different lift ejector assemblies by means of distribution duct assemblies 47 and 48. In other embodiments of aircraft system 10, principal propulsion subsystem 37 may alternatively include a high bypass ratio turbofan engine rather than the turbojet engine illustrated schematically in the drawings. Also, FIG. 2 schematically illustrates bearing supports 49 provided at the inboard and outboard ends of each system ejector assembly flap or panel member to facilitate rotation of such members relative to supporting fuselage structure during utilization of the invention.

Although FIGS. 1 and 2 illustrate an aircraft system having canard surfaces of lesser plan area and located forwardly of principal wing airfoils 12, 13, the herein described and claimed invention has equal application to aircraft system configurations having stabilization airfoils of smaller plan area located after the system principal airfoils. The invention also has application to aircraft system configurations having principal, wing-like airfoils provided with lift ejectors of the type detailed further in FIG. 3 but having stabilization airfoils provided with forms of attitude stabilization/control apparatus other than lift ejectors.

FIG. 3 schematically illustrates a representative construction of the lift ejector assembly provided in each of the airfoils of aircraft system 10. Such lift ejector assembly, designated 22 in FIG. 3, basically includes a forward injector flap member 23, an after injector flap member 24, and a center or core injector panel member 25. Flap member 23 is an assembly essentially comprised of hereinafter described straight-line injector means 50 in combination with an attached airfoil-shaped panel 51 that provides for proper closure of airfoil ejector opening 52 at the underside of representative airfoil 13 during conventional flight and that functions to in-part define the diffuser section of lift ejector 22 in vertical, hovering, and transitional modes of aircraft system operation. Straight-line injector means 50 is essentially a tubular member with interior passageway 53 and with a cooperating slot 54 that each extend essentially throughout the assembly length. After injector flap member 24 also includes a straight-line injector means, designated 55 and located opposite similar means 50, and an attached airfoil-shaped panel. It is preferred that panel 56 have a cross-sectional configuration or shape whose upper and lower surfaces comprise a continuation of the adjacent contoured upper and lower surfaces of the airfoil 13 in which it is installed. Thus, and in its conventional flight positions, panel 56 throughout its span comprises an airfoil movable trailing edge. Panel 56 functions in the manner of a flap/aileron during operation of aircraft system 10 in conventional flight. In the vertical, hovering, and transitional modes of flight operation of aircraft system 10, however, flap member 24 functions in combination with the other component parts of assembly 22 and provides part definition of the diffuser section of lift ejector assembly 22. Injector means 55, like means 50, is essentially a tube-like member having interior passageway 57 and slot 58 extending throughout its length. Forward and after injector flap members 23 and 24 are normally actuated independently but in a coordinated manner by suitable actuator means as hereinafter described. An additional and separately actuated streamlined panel member 64 may be attached to and supported in assembly 24 by injector means 55 for the hereinafter mentioned closure purposes.

Center injector panel member 25 is comprised of a core injector means 60 in combination with an attached fairing 61 of conventional construction. Injector means 60 is, as in the case of injector means 50 or 55, a tube-like member with an interior passageway 62 and a nozzle or slot opening 63 extending essentially throughout its length. Member 25 normally is rotated in coordination with but independently of flap members 23 and 24. In some instances, however, center panel member 25 may preferably be rotationally driven through a suitable linkage or gearing connection (not shown) to forward flap member 23. Panel 61, in combination with previously mentioned panel 64, functions to provide closure for the system ejector secondary fluid flow induction opening 52 at the upper surface of airfoil 13 during the course of conventional flight operation of aircraft system 10. Airfoil-shaped panel 51 provides for opening closure at the under surface of airfoil 13 in its conventional flight configuration. See FIG. 6.

High-energy fluid, normally in the form of the gaseous products of combustion of power plant subsystem 37, is delivered during system 10 non-conventional modes of flight operation by means of distribution ducting 47, 48, from at or after the turbine section 42 of propulsion subsystem 37 and preferably at a pressure ratio of approximately 1.3 or greater, to the interior passageways 53 and 57 of Coanda injector means 50 and 55 and to the interior passageway 62 of center (core) injector assembly 60 of each system lift ejector assembly. Distribution ducting 47, 48 is normally sized to minimize fluid flow energy losses and to achieve duct flow velocities of about 0.25 Mach typically to as great as approximately 0.4 Mach. The pressurized high-energy ejector primary fluid flowed to all system flap assemblies 23, 24 and 25 or their equivalents is proportioned so that approximately 30% to 70% of the total flow to each lift ejector assembly is distributed to core injector 60 and discharged through nozzle opening 63. The balance directed to each such airfoil lift ejector is divided between and distributed to injector members 50 and 55 for discharge from slots 54 and 58 in opposite directions generally toward core injector assembly 25. Such opposite directions are essentially at right angles to the direction of fluid flow through the lift ejector assembly 22 and to the direction of vector orientation of the fluid-reaction lift developed for vertical, hovering, or transitional flight. Gaseous fluids are discharged through slot and nozzle openings 53, 58, and 63 in each ejector assembly preferably at a velocity of at least approximately 0.7 Mach to as high as 1.0 Mach or slightly greater. Nozzle opening 63 is located adjacent or slightly above the plane of the throat section of ejector assembly 22 in the vertical flight operating configuration. Operation of typical forward and after injector flap members 23 and 24 in combination with core injector 25 and received high-energy fluid from the aircraft system principal power plant is effective to produce thrust augmentation ratios in each lift ejector 18, 22, etc. to as high as at least approximately 1.6 under preferred operating conditions.

FIGS. 4, 5 and 6 schematically illustrate the typical cross-sectional configurations of airfoil 13 for representative vertical/hovering, transitional, and conventional modes of flight operation, respectively. The FIG. 4 airfoil configuration is for the vertical ascent/descent and hovering modes of flight operation in which the lift ejector diffuser section typically formed by injector flap members 23 and 24 has a principal longitudinal axis 67 oriented in a vertical flight reference direction. By the hereinafter described pilot-operated control means, the injector flap members of airfoil 13 may be operated in combination with center core injector assembly 25 to the FIG. 5 airfoil configuration whereby axis 68 of the lift ejector assembly is oriented for transitional flight. In the FIG. 5 configuration, high-energy primary flow fluid is injected into the lift ejector from injector assemblies 23, 24, and 25, and secondary flow fluid (air) is entrained in the primary flow fluid from above the airfoil upper surface as in the case of the FIG. 4 airfoil configuration to develop improved thrust augmentation and total fluid-reaction lift. For conventional modes of flight operation the control apparatus of this invention is operated to position injector flap members 23, 24 and center injector panel member 25 in the FIG. 6 typical airfoil configuration. In the FIG. 6 configuration conventional aerodynamic lift forces are developed at airfoil 13 as a result of forward flight resulting from normal propulsion forces being applied to fuselage 11 by the system primary power plant 37.

In the instant description, attention is given primarily to an aircraft system 10 having wing airfoils 12 and 13 and also additional canard airfoils 14 and 15 similarly positioned with respect to the system longitudinal axes but at a plan location distant from the system center of gravity. The addition of canard airfoils 14, 15 to the FIG. 1 system distant from the center of gravity is desirable for developing system longitudinal stabilization and attitude change control. However, the instant invention alternatively also has application to aircraft systems having lift ejector assemblies (e.g., 18, 22) installed only in principal aerodynamic lift-producing airfoil structures (e.g., wings) attached to the system fuselage.

In such alternate instances the hereinafter-described controls are useful for developing changes in system lateral and directional attitudes in addition to developing fluid-reaction lift for nonconventional modes of flight operation. Changes in system longitudinal (pitch) attitude in such systems are effected using lift-varying devices other than lift ejector assemblies of the type having forward and after injector flap members. Also, and although not shown in the drawings, aircraft system 10 can be made capable of limited reverse flight in its vertical ascent/descent or hovering modes of flight operation. Such is accomplished by the hereinafter described control means being operated to orient the axis of each airfoil lift ejector assembly to a nonvertical orientation such as a minor clockwise rotation of axis 67 relative to the FIG. 4 axis 67 orientation.

FIG. 7 is provided in the drawing to graphically and pictorially illustrate the preferred manner of operating each lift ejector assembly in aircraft system 10 during system nonconventional modes of flight operation. Curve 69 plots the thrust augmentation ratio that is obtained in a typical lift ejector assembly 18, 22, etc. as a function of the lift ejector diffuser section divergence angle. Curve 69 extends over a diffuser section divergence angle range of approximately from $-10°$ to $+10°$ and over a correlated thrust augmentation ratio range extending approximately from 0.85 to 1.65. The 0° abscissa value is for a nondivergent diffuser section condition and is not a measure of fluid-reaction lift vector orientation relative to a condition of vertical ascent/descent. It is important to note that practice of the invention in accordance with the conditions stated and illustrated in FIG. 7 involves, particularly in the control range, preferred operation of the aircraft principal power plant at constant power and at near-maximum output power. Improved system response to pilot commands for changes in system attitude is obtained under the preferred conditions of system operation.

FIG. 8 illustrates graphically and pictorially the nominal airspeed operating ranges associated with the different airfoil configurations in one particular aircraft system. As shown in that illustration, the FIG. 4 configuration of a representative airfoil 13, 14 for vertical ascent/descent flight or for hovering flight is useful throughout a forward flight velocity range of from 0 to approximately 45 knots. (As previously described, the ejector assemblies in airfoils 13, etc. can be operated to produce limited reverse direction flight by proper limited clockwise rotation and positioning of the injector flap members and center panel member relative to the FIG. 4 illustrated orientations). The representative FIG. 5 transitional flight configuration of airfoil 13 normally occurs throughout a forward velocity range of approximately from 30 to 110 knots. In the transitional mode of flight operation the fluid-reaction lift developed in the included lift ejector is vectored properly and for sufficient time to produce a forward flight velocity wherein conventional aerodynamic lift is developed at airfoil 13 to sustain the system in a conventional mode of flight operation. In the aircraft system disclosed, it is also preferred that the various after injector flap members be operated, as throughout the transitional/conventional flight velocity range of 80 to 170 knots, collectively and as conventional aircraft flap members to increase airfoil chordwise camber and thereby augment conventional aerodynamic lift produced in airfoil 13 by improving airflow phenomena relative to the airfoil upper and lower surfaces. In the further illustrated pure conventional flight range of from approximately 125 knots to $V_{max}$, which may extend to as high as 2.0 Mach for example, the after injector flap members 20, 24, etc. are selectively positioned independently of the forward flap members and without being operatively connected to the system principal power plant and primarily to effect changes in system attitude without significantly changing total developed lift.

FIGS. 9 through 23 are provided in the drawings to schematically illustrate the important constructional and functional characteristics of the pilot-operated control system provided in aircraft 10 to control fuselage attitude during all modes of flight operation. Since the FIGS. 9 through 23 control system is operable to control system flight attitude throughout several different directional freedoms, to almost infinite attainable degrees of attitude change, and in variable modes of flight operation, and therefore is markedly complex, the various included control systems are best illustrated separately for each different basic mode of flight and different basic freedom of roll, direction, and pitch change. Also, in a representative control system installation constructed and operated in accordance with this invention, numerous conventional linkages comprised of connecting rods, push-pull cables, sectors, pulleys, and like force-transmitting mechanical elements are provided to route the command signal or force originated by the aircraft pilot to particular actuators and attached surfaces. In the drawings, however, essentially only representative elements for obtaining particular relative command actuating motions are illustrated in detail. In one embodiment of the invention a conventional hydraulic boost actuator controlled linearly by an attached state-of-the-art servo valve mechanism that is moved by the control system linkage to desired displacement positions is preferred. Another type of control system, e.g., a manually-powered, a partially power-boosted, or an electrical "fly by wire" type might be employed in aircraft system 10 as the equivalent of the mechanical linkage/hydraulic actuator arrangements shown in FIGS. 9 and subsequent.

Figure 9:
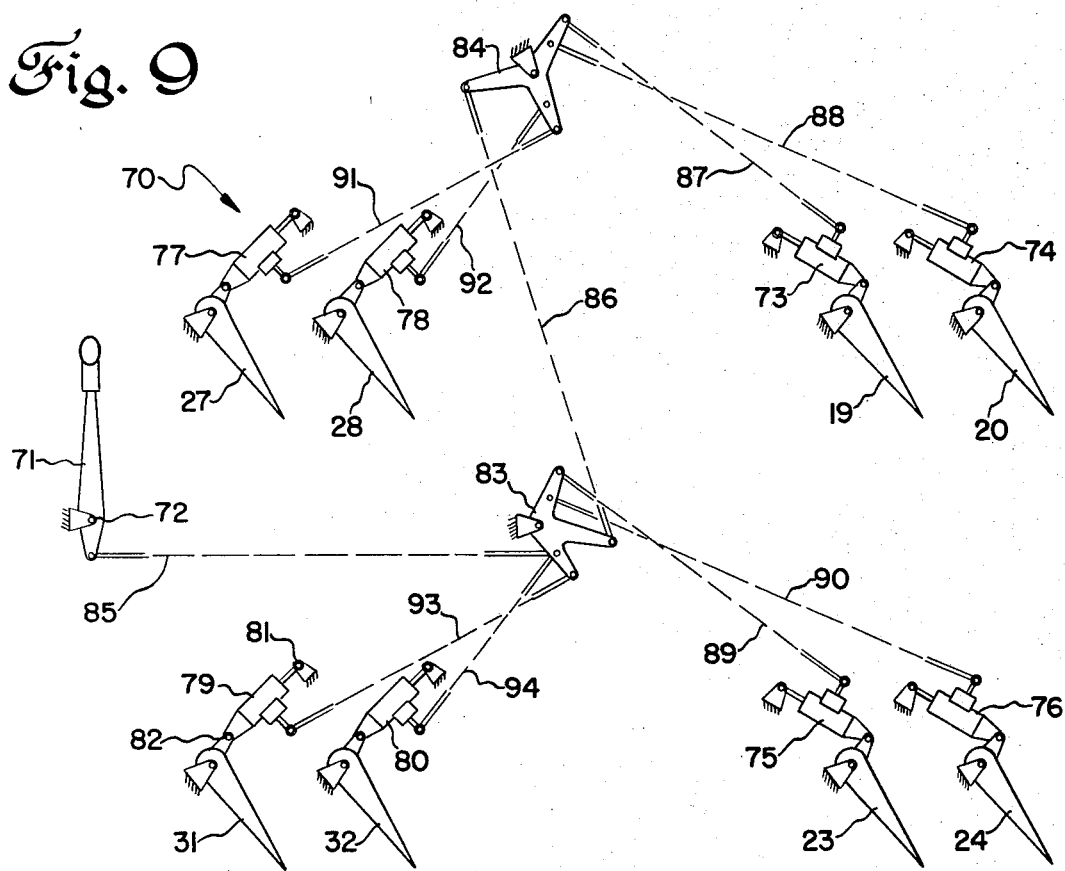
FIG. 9 schematically illustrates the pilot-operated control system incorporated in the FIG. 1 aircraft system for controlling lateral attitude during vertical ascent/descent, hovering, or transitional flight modes of operations.

FIG. 9 discloses the principal functional components employed in lateral flight control system 70 for use in control of aircraft 10 in vertical, hovering, and transitional modes of flight operation. Such flight control system includes a conventional pilot-operated control stick 71 pivotally supported at axis 72 associated with fuselage structure. Control stick 71 is mechanically connected by the hereinafter described means to the hydraulic actuators operably connected to injector flap members 19, 20, 23 and 24 in principal airfoils 12, 13 and also to the actuators for similar flap members 27, 28, 31 and 32 in attitude control airfoils (canards) 14, 15. Each such flap member corresponds to the respectively numbered forward and after injector flap members shown in the plan arrangement of FIG. 2. The conventional servo-valved hydraulic actuator devices connected to the illustrated flap members are referenced by the numerals 73 through 80 and each such device is normally pivotally supported at its rod end 81 by airfoil structure and pivotally connected at its cylinder or housing end 82 to flap member operating arm or lever fixedly attached to flap member structure as shown in FIG. 9. Lateral control system 70 further includes two multi-arm bellcranks 83, 84 pivotally supported by aircraft structure and pivotally connected to each other and to control stick 71 through the schematically illustrated, bi-directionally movable, force-transmitting connecting linkages 86 and 85. The linkages connecting bellcranks 83 and 84 to actuators 73 through 80 are designated in the drawings by the reference numerals 87 through 94. Pivot connections are provided at the extremes of each such linkage, however, and although illustrated such are not numbered. The injector flap members illustrated in FIG. 9 are shown in representative intermediate positions associated with the transitional mode of flight operation.

Figure 10:
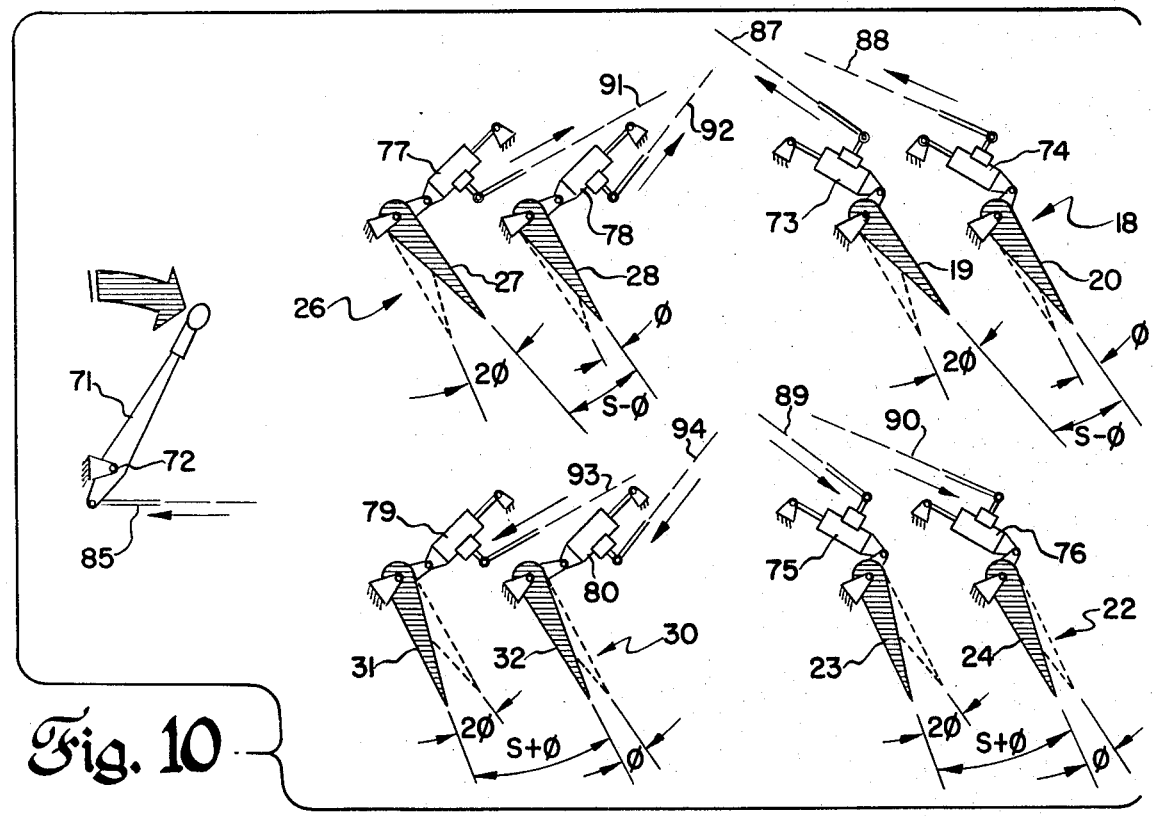
FIG. 10 schematically illustrates the positioning of aircraft system airfoil forward and after injector flap members in response to pilot operation of the FIG. 9 flight control system to achieve a right-roll attitude for the FIG. 1 aircraft system during vertical ascent/descent, hovering, or transitional flight.

Injector flap members 19, 20, etc. in system 70 are movably controlled in a coordinated manner with respect to each other to obtain particular directions and rates of aircraft system lateral attitude change. FIG. 10 illustrates the movements effected in system 70 flap members 19, 20, etc. as a result of moving control stick 71 from the FIG. 9 vertical position indicative of a stabilized aircraft lateral attitude to the FIG. 10 position for effecting a right-roll change in system attitude. Basically flap members 19, 20, 27 and 28 are moved relative to each other in a manner diminishing the diffuser section divergence angles to reduce the lift associated therewith by reducing the thrust augmentation obtained in lift ejector assemblies 18 and 26. Movement of control stick 71 in the indicated right-roll direction also operates to move actuators 75, 76, 79, 80 in the directions indicated by the arrows and in a diffuser section increasing divergence angle manner to thereby increase the lift associated with lift ejectors 22, 30. The decreasing/increasing of lift ejector diffuser section divergence angles is accomplished mechanically by having the radius of the connecting rod pivot connections to bellcranks 83, 84 at different distances from each bellcrank axis of rotation. In one embodiment of control system 70, by way of example, a typical flap member such as flap member 20 is moved at half the rate of its associated forward injector flap member 19 by reason of connecting linkage 87 to bellcrank 84 at twice the distance from the axis of rotation of bellcrank 84 as is at the pivot connection of linkage 88 to that bellcrank. Rotation of control stick 71 counterclockwise from its FIG. 9 position and about axis 72 is effective to cause left-roll changes in the lateral attitude of aircraft system 10 during nonconventional flight. It should be noted that the rate of rotation differential obtained in system 70 (and also control system 120 of FIGS. 13 and 14) is also effective to change the thrust vector orientations defined by lift ejectors 26 and 30, for example, differentially. As shown in FIG. 10, the thrust axis of lift ejector 26 is incrementally rotated through the angle $\phi/2$ counterclockwise and the thrust axis of lift ejector 30 is rotated through the incremental angle $\phi/2$ clockwise, each from the illustrated dashed line reference position and in response to unit change of stick 71. Such differential rotation of vector lines of action provides for force compensation in directions parallel to the system longitudinal axis to eliminate an otherwise present system tendency to yaw or change directional orientation about the system center of gravity.

Figure 11:
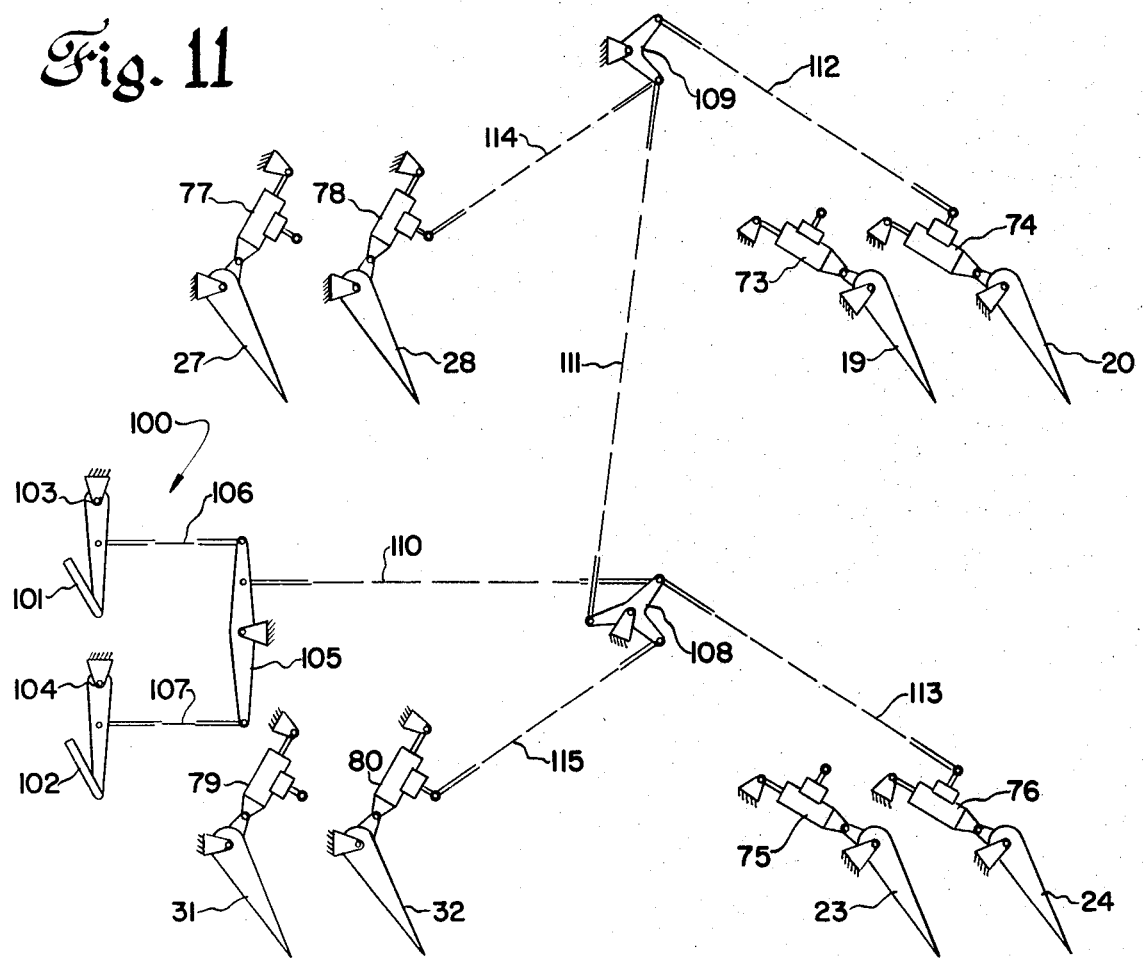
FIG. 11 schematically illustrates the pilot-operated control system incorporated in the FIG. 1 aircraft system for controlling directional attitude during vertical ascent/descent, hovering, or transitional flight modes of operation.
Figure 12:
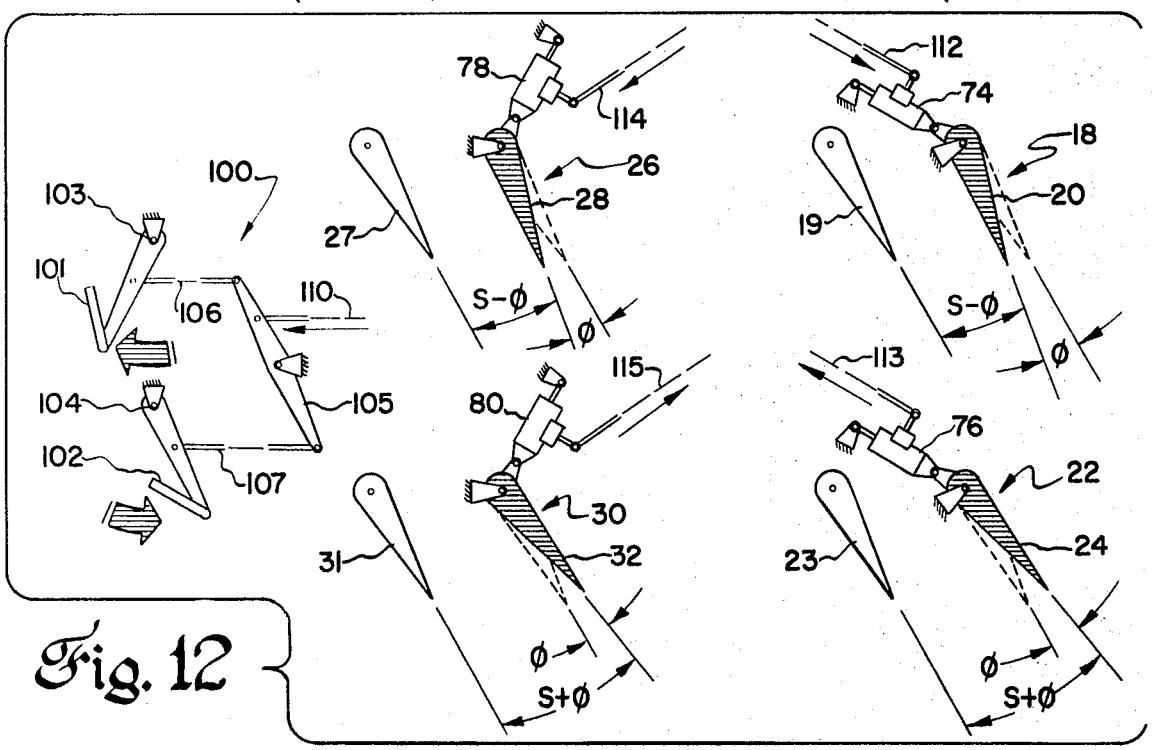
FIG. 12 schematically illustrates the positioning of aircraft system airfoil forward and after injector flap members in response to pilot operation of the FIG. 11 flight control system to achieve a right-turn attitude for the FIG. 1 aircraft system during vertical ascent/descent, hovering, or transitional flight.

FIGS. 11 and 12 illustrate control system 100 provided in aircraft 10 for developing directional control as a result of pilot command forces being applied to conventional right-turn and left-turn rudder pedals 101, 102. The injector flap member and hydraulic actuator device combinations illustrated in control system 100 are the same as the corresponding combinations shown in FIG. 9 and therefore such are numbered in the same manner. However, the principal control input, mechanical linkage, and bellcrank couplings included in system 100 are different than the comparable components in system 70. Rudder pedals 101 and 102 are connected to aircraft structure at pivot connections 103 and 104. A straight-line bellcrank 105 is pivotally connected to aircraft structure at a mid-point in its length and is pivotally connected to pedals 101, 102 by linkages 106, 107, which are each pivotally connected at their respective ends. System 100 is further provided with multi-arm bellcrank members 108 and 109 for developing the desired coordinated actuation of the different system hydraulic actuator-flap member combinations and each is pivotally supported by aircraft structure as shown. The connections from bellcranks 108 and 109 to actuator/flap member combination occurs in system 70 only with respect to after flap members 20, 24, 28 and 32 and such is accomplished by linkages 112, 113, 114 and 115. Bellcranks 108 and 109 are interconnected to each other and to control bellcrank 105 by pivotally-terminated linkages 111 and 110.

FIG. 12 shows the manner whereby movement of rudder pedals 101, 102 for a right-turn aircraft system maneuver causes coordinated movement of the control system 70 after flap members 20, 24, 28 and 32 only. As observed in FIG. 12, a pilot command force to initiate a turn maneuver causes no relative displacement of the included control system forward injector flap members. The indicated FIG. 12 displacement of after flap members causes the diffuser section divergence angles of the lift ejectors 18, 26 in airfoils 12 and 14 to be decreased to reduce the magnitude of vectored fluid-reaction lift developed at adjacent airfoil structure, and causes the diffuser section divergence angles of the lift ejectors 22, 30 in airfoils 13, 15 to be increased to increase the magnitude of vectored fluid-reaction lift produced at the opposite side of the system longitudinal axis thus producing a right-turn directional change moment. Movement of rudder pedals 101 and 102 from their FIG. 11 position and in directions opposite to the movements shown in FIG. 12 is effective to cause left-turn changes in the directional attitude of aircraft system 10 during nonconventional flight.

In constructing an aircraft control system in accordance with this invention it is preferred that there be no significant change in total lift developed by the lift ejectors in the course of effecting changes in system flight attitude. Also, in the FIG. 9 through 12 arrangement an aircraft system configuration utilizing the present invention in relation to both principal aerodynamic lift-producing airfoils (wings 12, 13) and secondary, attitude stabilization airfoils (canards 14, 15) is illustrated. In aircraft systems not requiring longitudinal attitude control by means of lift ejectors installed in secondary attitude stabilization airfoils such as 14, 15, those portions of systems 70 and 100 pertaining to lift ejectors 26, 30 may be omitted without eliminating the capability for effecting lateral and directional control in vertical, hovering, and transitional flight from the remaining control system portions installed in principal airfoils 12, 13.

Figure 13:
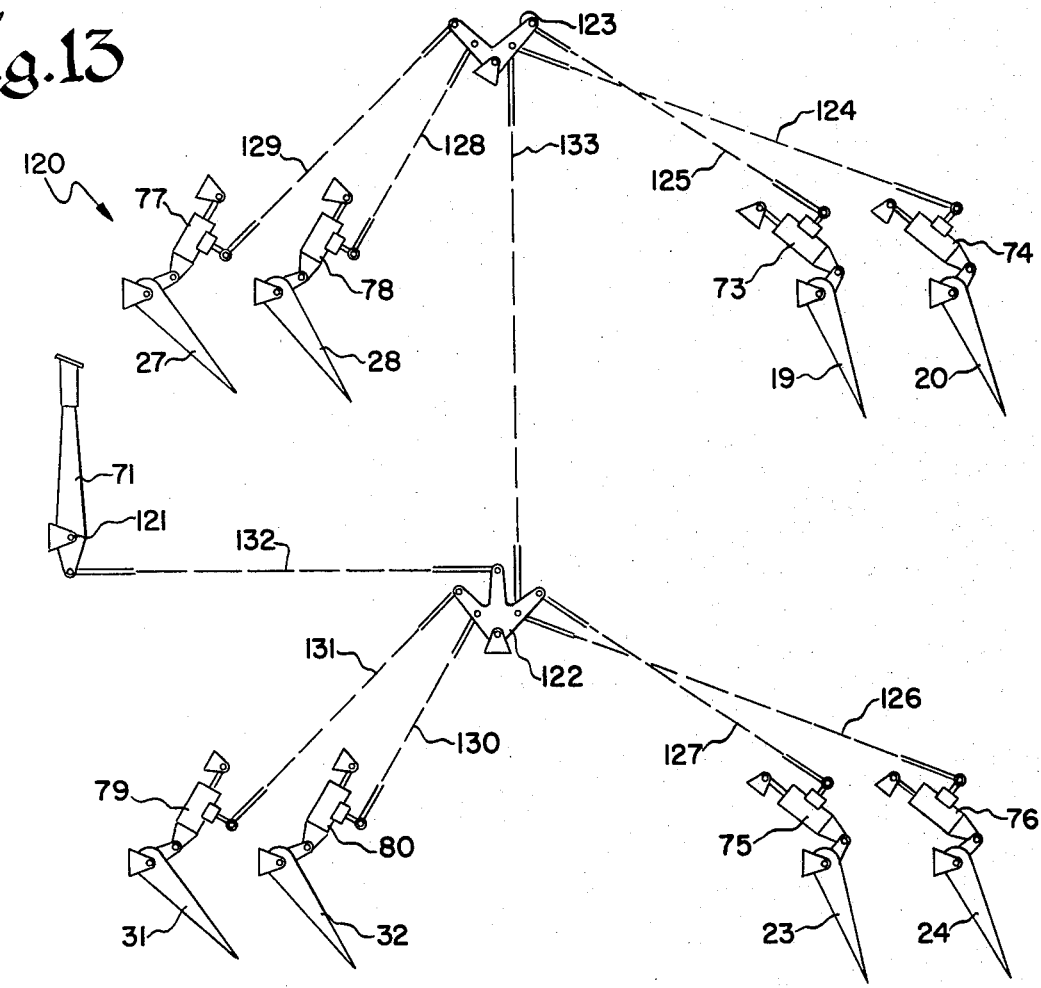
FIG. 13 schematically illustrates the pilot-operated control system incorporated in the FIG. 1 aircraft for controlling longitudinal attitude during vertical ascent/descent, hovering, or transitional flight modes of operation.
Figure 14:
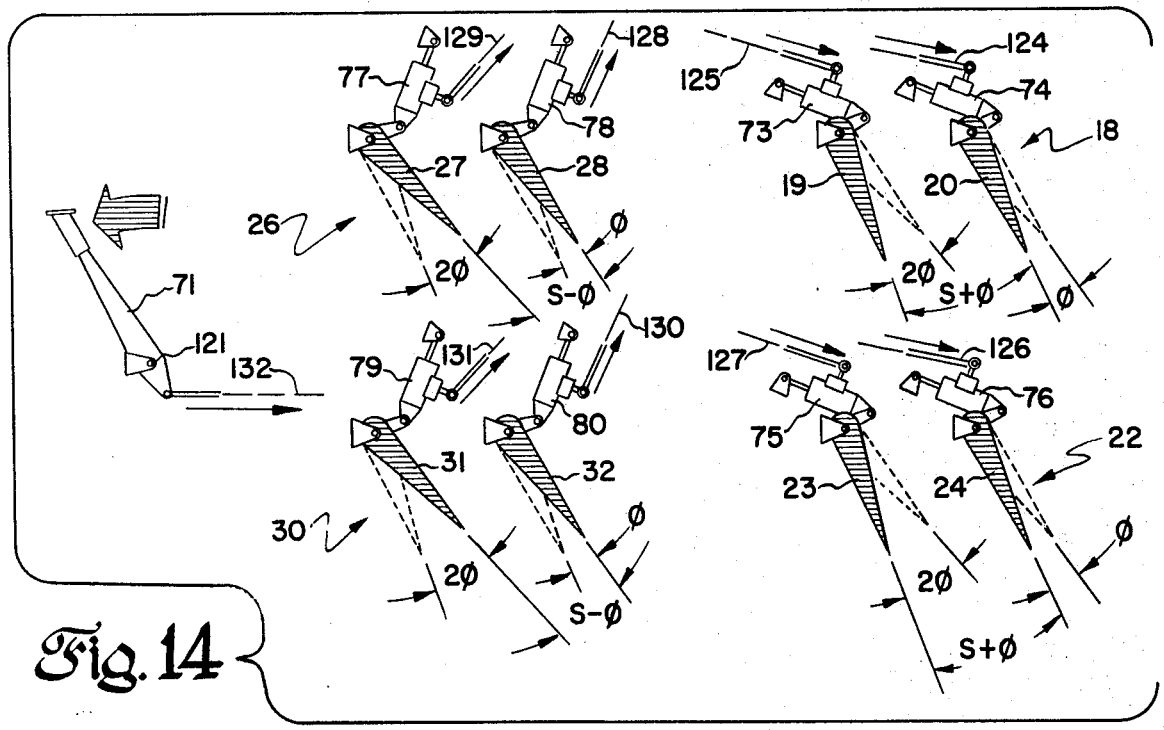
FIG. 14 schematically illustrates the positioning of aircraft system airfoil forward and after injector flap members in response to pilot operation of the FIG. 13 flight control system to achieve a nose-down attitude for the FIG. 1 aircraft system during vertical ascent/descent, hovering, or transitional flight.

FIGS. 13 and 14 disclose details of construction and operation of a longitudinal flight control system 120 installed in aircraft for effecting changes in system pitch attitude.

Control stick 71 is shown mounted for forward and after rotation about additional pivot axis 121. The different hydraulic actuator and injector flap member combinations illustrated in FIG. 13 are the same as the correspondingly numbered actuator/flap member combinations shown in FIGS. 9 through 12. Control system 120 also has multi-arm bellcranks 122 and 123 pivotally supported by aircraft structure and functions in response to longitudinal attitude change command forces or signals inputted to control stick 71 to obtain proper coordinated motion of the different illustrated flap members and correlated changes in fuselage pitch attitude. As in the case of control system 70, included connecting linkages 124 through 131 are connected to obtain different rates of position change in the respectively connected forward and after flap members for purpose of effecting coordinated longitudinal control. Control system 120 further includes linkages 133 and 132 for pivotally interconnecting bellcranks 122, 123 with each other and to control stick 71.

FIG. 14 illustrates the changes which are effected in the system injector flap member positions as a result of moving control stick 71 counterclockwise from its vertical stabilized flight position in FIG. 13 to effect a nose-down change in aircraft longitudinal attitude. Counterclockwise rotation of control stick 71 functions to decrease the diffuser section divergence angles in lift ejectors 26, 30 to thereby reduce the fluid-reaction lift produced at airfoils 14, 15. Simultaneously the diffuser section divergence angles formed in lift ejectors 18, 22 by their associated flap members are increased by differential rotation of the members in each flap pair to increase the obtained ejector thrust augmentation ratio and consequential vectored ejector fluid-reaction lift. Diminished lift at airfoils 14, 15 (ejectors 26, 30) and increased lift at airfoils 12, 13 (ejectors 18, 22) produce a nose-down change in flight attitude of aircraft system 10. As in the case of lateral control system 70, one embodiment of the instant aircraft system invention utilizes a longitudinal control system 120 rotational rate for forward flap members 19, 23, 27 and 31 that is nominally twice the rotational rate in the same direction of after flap members 20, 24, 28 and 32, and such is accomplished by attachment of connecting linkages 124 through 131 to bellcranks 122, 123 at properly proportioned distances from the bellcrank axes of rotation. Rotation of control stick 71 clockwise from its FIG. 13 position and about axis 121 is effective to cause nose-up changes in the longitudinal attitude of aircraft system 10 during nonconventional flight operations.

FIGS. 9 through 14 illustrate, for convenience of illustration, that a linear relationship exists between the various control signal inputting elements 71, 101, etc. and the consequent movement of the respectively connected flap members through their correlated ranges of rotation. Generally it is preferred that the relationship be nonlinear in a manner to minimize or eliminate adverse cross-coupling effects particularly as sourced in differential thrust vector orientations. Such is important with respect to effecting the desired performance in the control system shown in FIGS. 15 through 17, and particularly in the vertical or hovering mode of flight operation.

Figure 15:
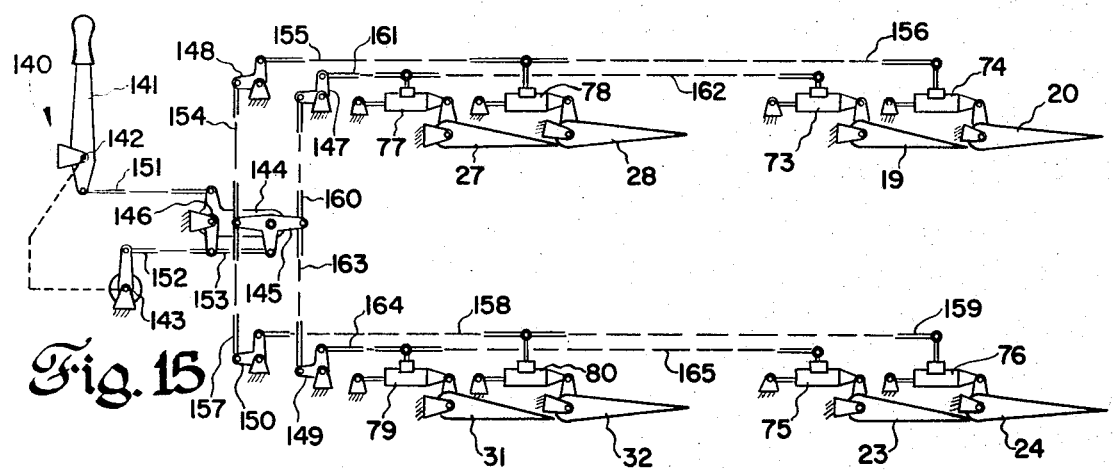
FIG. 15 schematically illustrates the lift mode control system incorporated in the FIG. 1 aircraft system of this application for use in effecting pilot selection of aircraft system mode of flight operation.
Figure 16:
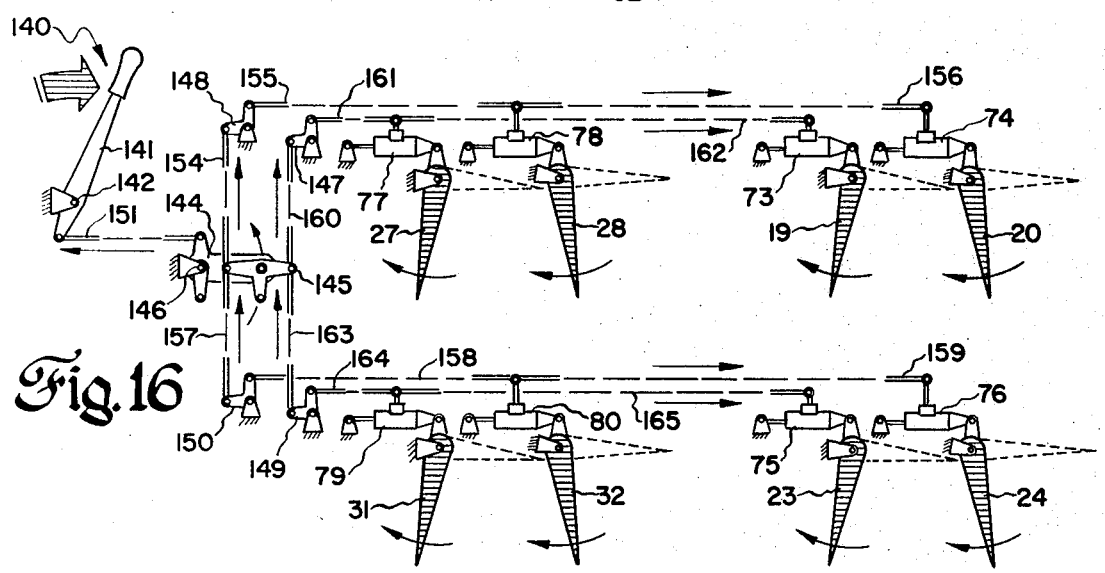
FIG. 16 schematically illustrates the positioning of aircraft system forward and after injector flap members collectively in response to pilot operation of the FIG. 15 lift mode control system to achieve a vertical flight or a hovering flight mode of operation for the FIG. 1 aircraft system.
Figure 17:
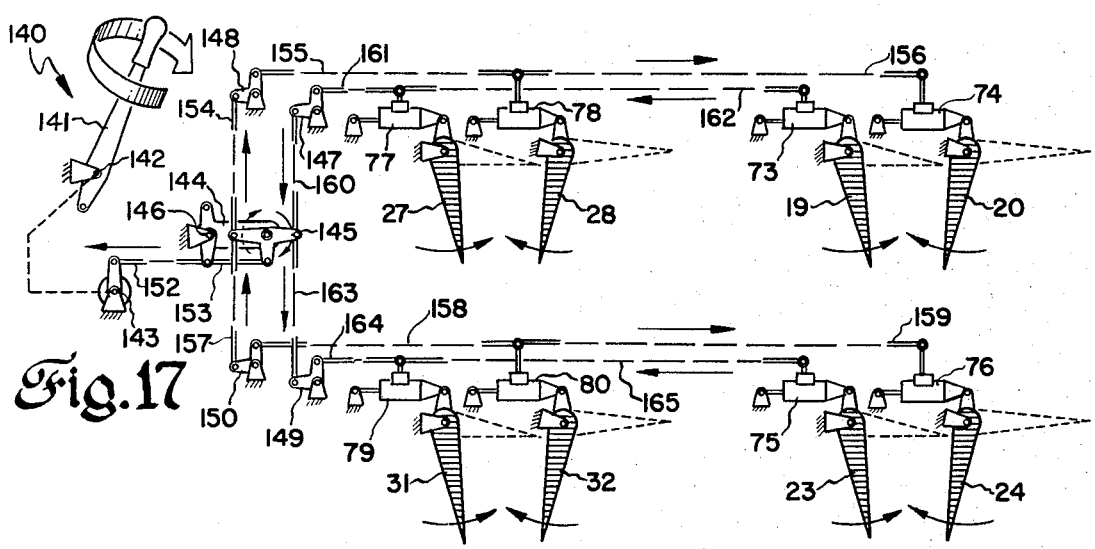
FIG. 17 schematically illustrates the positioning of aircraft system airfoil forward and after injector flap members collectively in response to pilot operation of the FIG. 15 lift mode control system to achieve variation of aircraft system total lift during operation of the FIG. 1 aircraft system in any particular vertical ascent/descent, hovering, or transitional flight mode.

FIGS. 15 through 17 schematically illustrate that portion of the control system for aircraft 10 which is concerned with selection of mode of flight operation (vertical, transitional, conventional) and additionally with trimming variation of total lift developed during system nonconventional flight operation. As shown in FIG. 15, the different forward and after injector flap members and connected hydraulic actuator devices are the same components utilized in the corresponding aspects of the system detailed in FIGS. 9 through 14. The illustrated mode selection system is referenced generally as 140 and includes a pilot-operated control stick 141 mounted for rotation about axes 142 and 143. Rotation of stick 141 about axis 142 is for effecting flight mode selection and rotation of stick 141 about axis 143 is for effecting system total lift variations. Axis 142 is normally laterally oriented relative to the aircraft longitudinal axis and axis 143 preferably corresponds to the longitudinal axis of stick 141 to permit lift trimming by means of a pilot-originated twisting moment being applied to an attached rotatable handle provided on stick 141.

As shown in the FIG. 15 arrangement control system 140 further includes a composite bellcrank 144, 145 pivotally supported to aircraft structure at axis 146 and additional bellcranks 147 through 150. Bellcranks 144, 145 are controlled for mode selection purposes by control stick 141 through linkage 151. Bellcranks 144, 145 are controlled for total lift variation purposes from control stick 141 by means of pivotally connected series linkages 152 and 153 moves by twisting moments about axis 143. Right-hand after flap members 20 and 28 are controlled through their respective hydraulic actuators 74 and 78 from bellcrank 144, 145 through pivotally connected linkages designated 154, 155, 156, and associated intermediate bellcrank 148. Similarly, left-hand after flap members 24 and 32 and their respectively connected hydraulic actuators 76 and 80 are controlled from bellcrank 144, 145 through pivotally connected linkages 157, 158 and 159 and associated intermediate bellcrank 150. The aircraft system forward flap members 19, 23, 27 and 31 are also controlled from bellcrank 145 carried by bellcrank 144 but through the right-hand pivotally connected linkages designated 160, 161 and 162 and associated intermediate bellcrank 147 and through the left-hand pivotally connected linkages 163, 164 and 165 and associated intermediate bellcrank 149.

Referring to FIG. 16, afterwards movement of control stick 141 from the illustrated FIG. 15 vertical position associated with conventional flight and about lateral axis 142 to the FIG. 16 position associated with vertical/hovering flight is effective to move all aircraft system 10 included injector flap members at substantially equal rates from their fully-faired position (FIG. 15) to an orientation which directs the force vectors produced by the lift ejectors in the system to produce a vertical flight condition. Control stick 141 at positions intermediate the extremes shown in FIGS. 15 and 16 develops different degrees of transitional flight in which the horizontal components of the fluid-reaction lift forces produced by all operating ejector assemblies are controllably vectored to produce aircraft system forward flight. The flight velocity achieved during system transitional modes of flight operation is essentially determined as a matter of force-time integration. Rotation of control stick 141 about axis 142 in a clockwise direction beyond its FIG. 16 position can be utilized to produce reverse flight during vertical/hovering modes of aircraft operation within permitted limits.

FIG. 17 illustrates the control of aircraft system injector flap members to produce trimming variations in total developed fluid-reaction lift during vertical, hovering, or transitional modes of flight operation. The same linkages described in connection with FIGS. 15 and 16, excepting linkage 151, are employed. As observed in FIG. 17, twisting rotation of control stick 141 about axis 143 by the pilot will cause movement of linkages 152 and 153 thereby causing rotation of bellcrank 145 about its axis of rotation on bellcrank 144. Twisting moments applied to the handle on control stick 141 in one direction produce reduced divergence angles in all connected lift ejector assemblies to thereby reduce system total lift, and in an opposite direction produce increased divergence angles in all connected lift ejector assemblies to thereby increase system total lift. See FIG. 7. It should be noted that in the modes of operation disclosed in connection with FIGS. 15 through 17, it is preferred that the principal power plant in aircraft system 10 be operated at substantially constant rotational speed (constant power) and at near the accepted level of continuous maximum power output. By coordinated and scheduled operation of fluid flow diverter means 43 in propulsion system 37, increased quantities of high-energy fluid are diverted from the system lift ejector assemblies to engine sections 44, 45 to develop increased conventional propulsion forces as final transitional flight stages approaching conventional flight are reached. In known aircraft system configurations, the zone of after flap positions whereat changes in operation from transitional flight to conventional flight are effected is in the range of approximately 30° to 20° down relative to the conventional flight centered position of FIG. 6.

Figure 18:
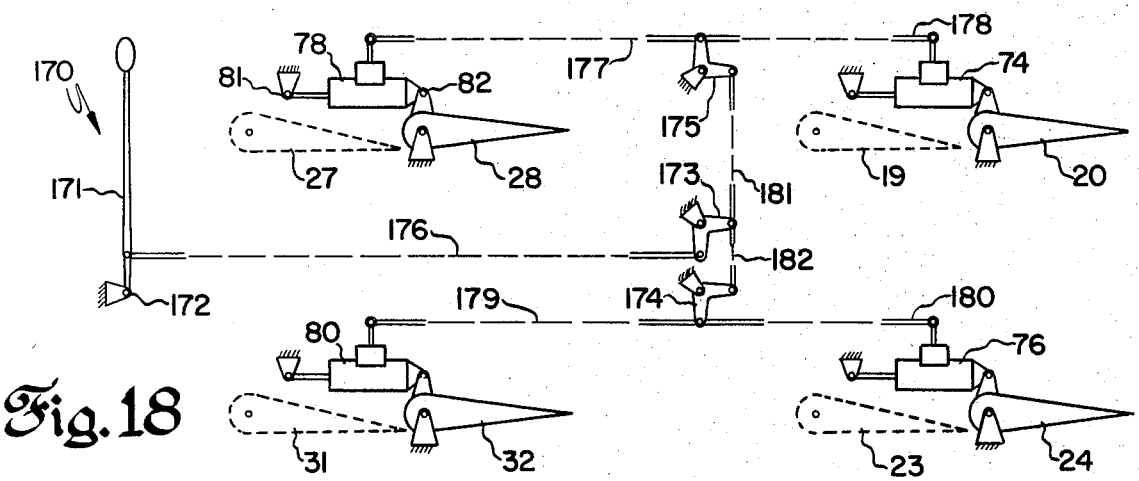
FIG. 18 schematically illustrates the pilot-operated control system incorporated in the FIG. 1 aircraft for controlling lateral attitude during conventional flight modes of operation.

FIG. 18 schematically illustrates lateral flight control system 170 incorporated in aircraft system 10 for use selectively in connection with conventional flight operations. As shown in that illustration pilot-operated control stick 171 pivotally mounted to aircraft structure at 172 controls operation of after injector flap members 20, 24, 28 and 32 independently of forward injector flap members 19, 23, 27 and 31 which remain in a relatively fixed position during aircraft system conventional flight operations. Hydraulic actuators 74, 76, 78 and 80 supported at their rod end 81 by aircraft structure and connected at their cylinder end 82 to an actuating arm on the respective flap members correspond to the like-referenced components described in connection with FIGS. 9 through 17. Control system 170 further includes bellcrank members 173, 174, and 175 and pivotally terminated connecting linkages 176 through 182.

Figure 19:
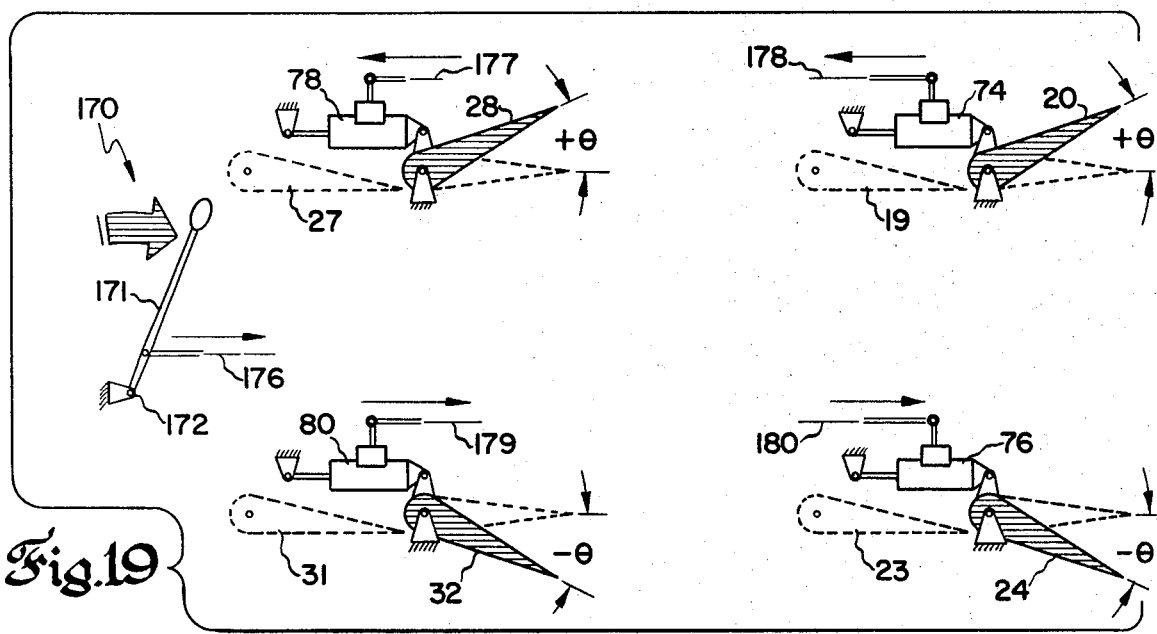
FIG. 19 schematically illustrates the positioning of aircraft system airfoil after injector flap members in response to pilot operation of the FIG. 18 flight control system to achieve a right-roll attitude for the FIG. 1 aircraft system during conventional flight.

Rotation of control stick 171 in a clockwise direction about axis 172 from its FIG. 18 vertical position associated with lateral stabilized flight to its FIG. 19 position for effecting a right-roll change in aircraft lateral attitude produces the changes in position in flap members 20, 24, 28 and 32 illustrated in FIG. 19. Upward rotation of flap members 20 and 28 causes a decrease in the chordwise camber of each of airfoils 12 and 14 and a consequent reduction in the aerodynamic lift produced during conventional flight, and simultaneous clockwise rotation of flap members 24 and 32 increases the chordwise cambers and net vertically upward forces acting on airfoils 13 and 15. Such differential displacement of flap members at opposite sides of the aircraft system longitudinal axis is effective to induce a right-roll change in aircraft attitude by creating a rolling moment about the aircraft longitudinal axis. Rotation of control stick 171 counterclockwise from its FIG. 18 position and about axis 172 is effective to cause left-roll changes in the lateral attitude of aircraft system 10 during conventional flight.

Figure 20:
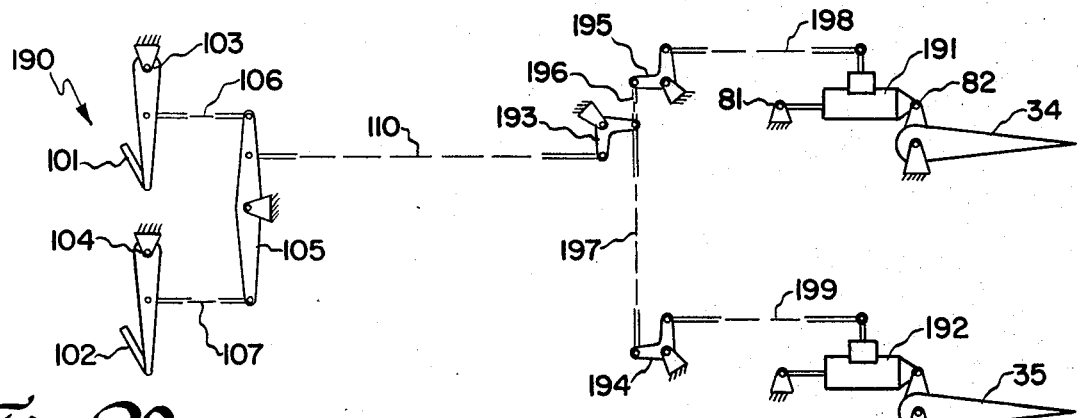
FIG. 20 schematically illustrates the pilot-operated control system incorporated in the FIG. 1 aircraft for controlling directional attitude during conventional flight modes of operation.

FIG. 20 schematically illustrates details of control system 190 provided in aircraft 10 for effecting changes in system directional attitude attitude during conventional flight. Rudder control surfaces 34 and 35 (See FIG. 1) are respectively connected to hydraulic actuator means 191 and 192 of the type previously described. Right and left rudder pedals 101 and 102 and axes and elements 103 through 107 and linkage 110 shown in FIG. 20 correspond to the like numbered components of control system 100 (FIG. 11). Additional bellcranks 193 through 195 and pivotally connected linkages 196 through 199 function to obtain proper coordinated rotation of rudders 34, 35 in response to turn command signals inputted to rudder pedals 101 and 102 by the aircraft pilot.

Figure 21:
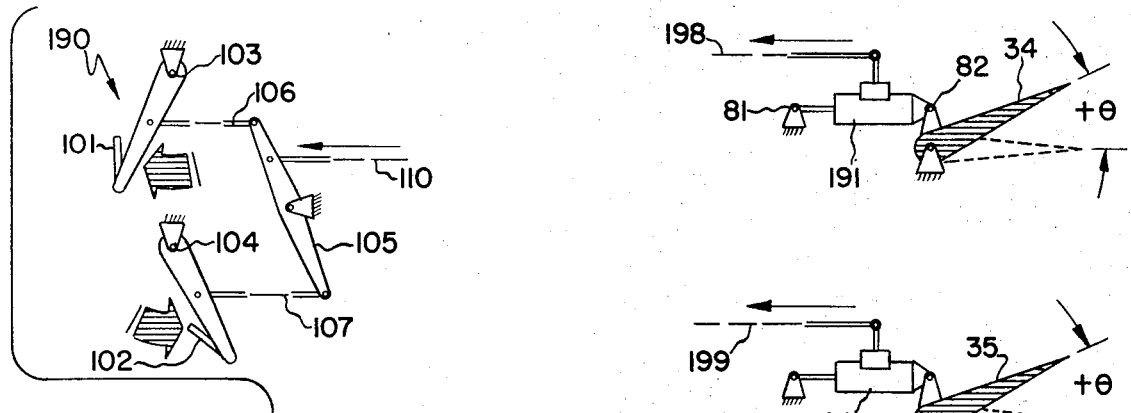
FIG. 21 schematically illustrates the positioning of aircraft system airfoil rudder members in response to pilot operation of the FIG. 20 flight control system to achieve a right-turn attitude for the FIG. 1 aircraft system during conventional flight.

As shown in FIG. 21 movement of rudder pedals 101 and 102 by the pilot in the directions indicated produces simultaneous rotation of rudder surfaces 34, 35 in a counterclockwise direction viewed from above to effect a right-turn change in the flight direction of aircraft system 10 in conventional flight. It should be noted that systems 100 and 190 can advantageously function simultaneously during transitional modes of flight operation so that the turning moments produced by each control arrangement reinforce or supplement each other. Also, movement of rudder pedals 101 and 102 from their FIG. 20 position and in directions opposite to the movements shown in FIG. 21 is effective to cause left-turn changes in the directional attitude of aircraft system 10 during conventional flight.

Figure 22:
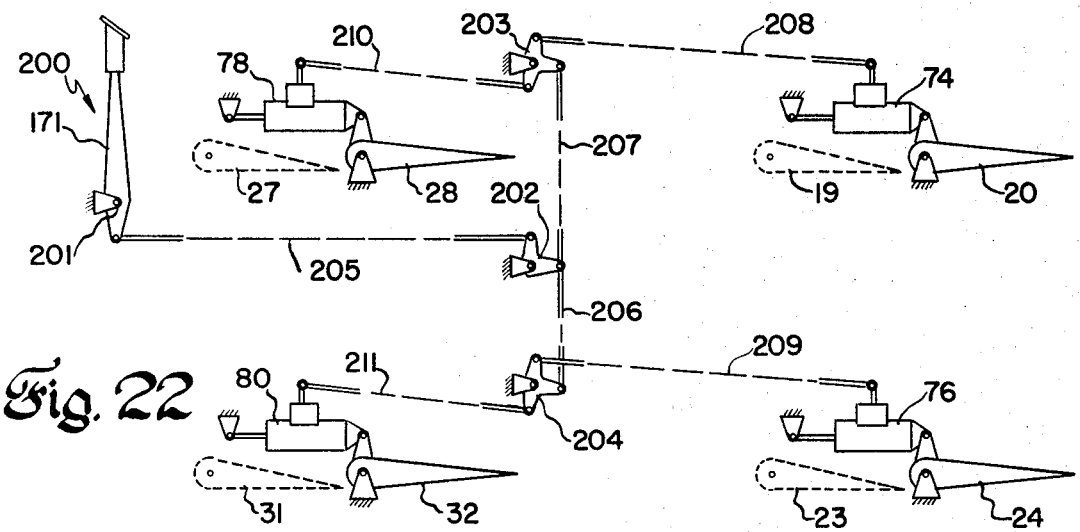
FIG. 22 schematically illustrates the pilot-operated control system incorporated in the FIG. 1 aircraft for controlling longitudinal attitude during conventional flight modes of operation.
Figure 23:
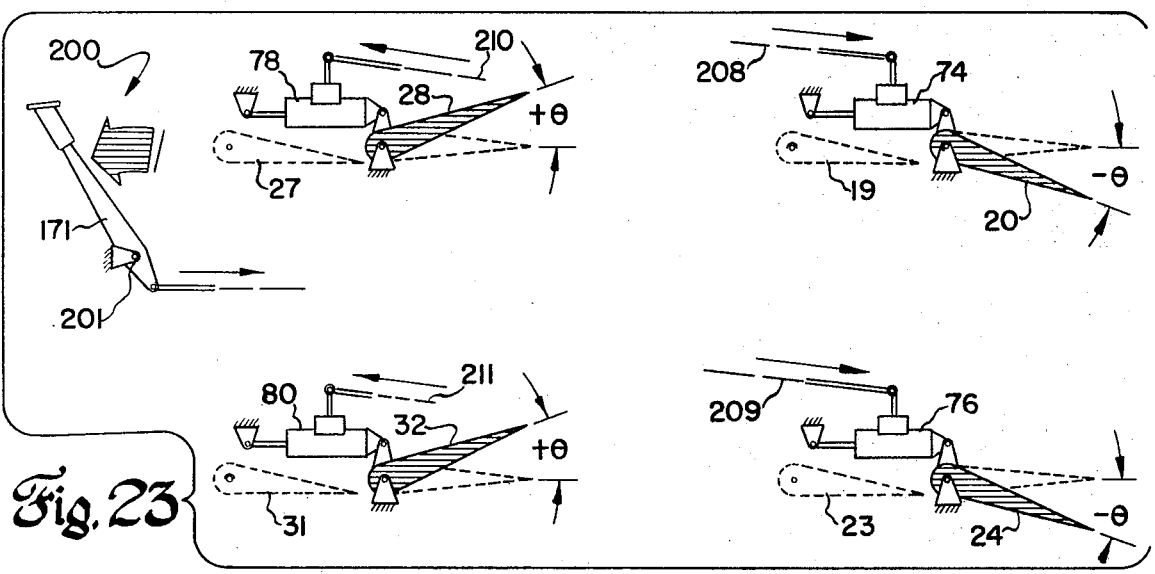
FIG. 23 schematically illustrates the positioning of aircraft system airfoil after injector flap members in response to pilot operation of the FIG. 22 flight control system to achieve a nose-down attitude for the FIG. 1 aircraft system during conventional flight.

FIGS. 22 and 23 detail longitudinal flight control system 200 provided in aircraft 10 for use to control airframe longitudinal (pitch) attitude in connection with conventional flight operations. Control stick 171 is pivotally supported by fuselage structure for rotation about additional axis 201 and is rotatable forward and after of the FIG. 22 vertical position to obtain nose-down and nose-up changes in aircraft pitch attitude. Such changes are accomplished through actuation of hydraulic actuators 74, 76, 78 and 80 and their respectively connected after injector flap members 20, 24, 28 and 32. The means connecting control stick 171 to such hydraulic actuators is essentially comprised of bellcranks 202, 203, and 204 and coupling linkages 205 through 211.

As shown in FIG. 23, rotation of stick 171 counterclockwise about axis 201 from its FIG. 22 vertical position to produce a nose-down change in aircraft attitude is effective to cause counterclockwise upward rotation of after injector flap members 28 and 32 and consequent chordwise camber decrease in airfoils 14, 15 and to cause clockwise downward rotation of after injector flap members 20 and 24 and consequent chordwise camber increase in airfoils 12, 13. Such rotation of flap members increases the total upward forces acting on principal airfoils 12 and 13 and reduces the lift produced conventionally at airfoils 14, 15. Such combined increased upward forces on the principal airfoils (12, 13) and reduced lift on the canard airfoils (14, 15), produces a turning moment about the aircraft system center of gravity sufficient to re-orient the flight direction of system 10 to a nose-down condition relative to FIG. 22 stabilized longitudinal flight. Rotation of control stick 171 clockwise about axis 201 and relative to its FIG. 22 vertical position is effective to produce an opposite turning moment to re-orient the flight direction of system in conventional flight to a nose-up condition relative to FIG. 22 stabilized longitudinal flight.

I claim:

1. In an aircraft system developing aerodynamic lift during forward flight along a system longitudinal axis and fluid-reaction thrust for flight in directions transverse to said longitudinal axis, in combination:

right airfoil means and left airfoil means positioned symmetrically with respect to and at opposite sides of said system longitudinal axis and each developing aerodynamic lift during forward flight;

a right forward flap member and a left forward flap member positioned symmetrically with respect to and at opposite sides of said system longitudinal axis, each said forward flap member being supported at a different one of said airfoil means for rotation to and from a position which partially defines a lift ejector diffuser section divergence angle a right after flap member and a left after flap member, each said after flap member cooperating with a respective one of said forward flap members in lift ejector-forming relation and being supported at a different one of said airfoil means for rotation to and from a position which partially defines a lift ejector diffuser section divergence angle;

first control means operably connected to said flap members and responsive to an attitude change input command signal to cause rotation of said right forward and after flap members in an opposite direction relative to each other to change the magnitude of the lift ejector diffuser section divergence angle defined thereby in one sense and said left forward and after flap members in an opposite direction relative to each other to change the magnitude of the lift ejector diffuser section divergence angle defined thereby in a sense opposite said one sense; and second control means operably connected to said flap members and responsive to a total lift change input command signal to cause rotation of each said flap member with said forward flap members being rotated in an opposite direction relative to the direction of rotation of said after flap members to change the magnitude of the lift ejector diffuser section divergence angles defined thereby in like senses, said first control means when operated varying the attitude of the aircraft system in response to said attitude change input command signal without significantly varying the total fluid-reaction thrust developed by said flap members at their defined lift ejector diffuser section divergence angles, and said second control means when operated varying the total fluid-reaction thrust developed by said flap members at their defined lift ejector diffuser section divergence angles in response to said lift change input command signal without significantly varying the attitude of the aircraft system.

2. The invention defined by claim 1 and further comprised of principal power plant means operable at different rotational speeds and producing a diverted high-energy fluid flow that is flowed intermediate said right forward and after flap members and intermediate said left forward and after flap members, said power plant means producing said diverted high-energy fluid flow being operated at constant rotational speed when said control means are operated to cause rotation of said flap members.

3. The invention defined by claim 1 and further comprised of third control means operably connected to said flap members and responsive to a fluid-reaction thrust vector orientation input command signal to cause rotation of said right and left forward flap members in a like direction and at a like rotational rate and to cause rotation of said right and left after flap members in a like direction that is the same as the like direction of rotation of said forward flap members and at a like rotational rate that is different than the like rotational rate of said forward flap members, said third control means when operated simultaneously varying the total fluid-reaction thrust developed by said flap members at their defined lift ejector diffuser section divergence angles and the orientation of the vector of said fluid-reaction thrust.

4. An aircraft system developing aerodynamic lift during forward flight along a system longitudinal axis and fluid-reaction thrust for flight in directions transverse to said longitudinal axis and comprising:

fuselage structure;

primary airfoil means attached to said fuselage structure and producing principal aerodynamic lift during aircraft system flight in a direction along said system longitudinal axis;

secondary airfoil means attached to said fuselage structure more distant from the aircraft system center of gravity than said primary airfoil means and producing stabilization aerodynamic lift during aircraft system flight in a direction along said system longitudinal axes;

power plant means producing a high-energy fluid flow at a selected power plant means rotational speed;

a right forward flap member and a left forward flap member in each said airfoil means and positioned symmetrically with respect to and at opposite sides of said system longitudinal axis, each said forward flap member being supported for rotation to and from a position which partially defines a lift ejector diffuser section divergence angle;

a right after flap member and a left after flap member in each said airfoil means and positioned symmetrically with respect to and at opposite sides of said system longitudinal axis in cooperating relation with said forward flap members, each said after flap member cooperating with a respective one of said forward flap members in lift ejector-forming relation and being supported for rotation to and from a position which partially defines a lift ejector diffuser section divergence angle;

first control means operably connected to said flap members and responsive to a first attitude change input command signal to cause rotation of said right forward flap members in an opposite direction relative to said right after flap members in each said primary and secondary airfoil means to change the magnitude of the lift ejector diffuser section divergence angles defined thereby in one sense and said left forward flap members in an opposite direction relative to said left after flap members in each said primary and secondary airfoil means to change the magnitude of the lift ejector diffuser section divergence angles defined thereby in a sense opposite said one sense; and second control means operably connected to said flap members and responsive to a total lift change input command signal to cause rotation of each said flap member with said forward flap members being rotated in an opposite direction relative to the direction of rotation of said after flap members to change the magnitude of the lift ejector diffuser section divergence angles defined thereby in like senses, said first control means when operated varying the attitude of the aircraft system in response to said first attitude change input command signal without significantly varying the total fluid-reaction thrust developed by said flap members at their defined lift ejector diffuser section divergence angles, and said second control means when operated varying the total fluid-reaction thrust developed by said flap members at their defined lift ejector diffuser section divergence angles in response to said total lift change input command signal without significantly varying the attitude of the aircraft system.

5. The invention defined by claim 4 and further comprised of a said first control means additionally responsive to a second attitude change input command signal to cause rotation of said primary airfoil means right and left forward flap members in an opposite direction relative to said primary airfoil means right and left after flap members to equally change the magnitudes of the lift ejector diffuser section divergence angles defined thereby in one sense and of said secondary airfoil means right and left forward flap members in an opposite direction relative to said secondary airfoil means right and left after flap members to equally change the magnitudes of the lift ejector diffuser section divergence angles defined thereby in a sense opposite said one sense, said first control means when operated varying the attitude of the aircraft system about said aircraft system center of gravity in response to said second attitude change input command signal without significantly varying the total fluid-reaction thrust developed by said flap members at their defined lift ejector diffuser section divergence angles.

6. The invention defined by claim 4 wherein said power plant means produces a diverted high-energy fluid flow that is flowed intermediate said right forward and after flap members and intermediate said left forward and after flap members in each said primary and secondary airfoil means, said power plant means producing said diverted high-energy fluid flow being operated at constant rotational speed when said control means are operated to cause rotation of said flap members.

7. The invention defined by claim 4 and further comprised of third control means operably connected to said flap members and responsive to a fluid-reaction thrust vector orientation input command signal to cause rotation of said right and left forward flap members in each said primary and secondary airfoil means in a like direction and at like rates and to cause rotation of said right and left after flap members in each said primary and secondary airfoil means in a like direction that is the same as the like direction of rotation of said forward flap members and at a like rotational rate that is different than the like rotational rate of said forward flap members, said third control means when operated simultaneously varying the total fluid-reaction thrust developed by said flap members at their defined lift ejector diffuser section divergence angles and the orientation of the vector of said fluid-reaction thrust.

* * * * *